(12) United States Patent
Zalevsky et al.

(10) Patent No.: US 10,883,818 B2
(45) Date of Patent: Jan. 5, 2021

(54) OPTICAL TRANSFORMING AND MODULATED INTERFERENCE PATTERN OF A MOVING OBJECT

(71) Applicant: CONTINUSE BIOMETRICS LTD., Tel Aviv (IL)

(72) Inventors: Zeev Zalevsky, Rosh HaAyin (IL); Javier Garcia, Valencia (ES); Moshe Arie Ariel Schwarz, Bnei Brak (IL); Yevgeny Beiderman, Tel Aviv (IL)

(73) Assignee: CONTINUSE BIOMETRICS LTD., Tel Aviv (IL)

( * ) Notice: Subject to any disclaimer, the term of this patent is extended or adjusted under 35 U.S.C. 154(b) by 0 days.

(21) Appl. No.: 16/078,810

(22) PCT Filed: Feb. 7, 2017

(86) PCT No.: PCT/IL2017/050146
§ 371 (c)(1),
(2) Date: Aug. 22, 2018

(87) PCT Pub. No.: WO2017/145145
PCT Pub. Date: Aug. 31, 2017

(65) Prior Publication Data
US 2019/0063898 A1 Feb. 28, 2019

Related U.S. Application Data

(60) Provisional application No. 62/299,598, filed on Feb. 25, 2016.

(51) Int. Cl.
*G01B 9/02* (2006.01)
*G01P 3/36* (2006.01)
(Continued)

(52) U.S. Cl.
CPC ....... *G01B 9/02094* (2013.01); *G01B 9/0201* (2013.01); *G01B 9/0203* (2013.01);
(Continued)

(58) Field of Classification Search
CPC ............ G01B 9/02094; G01B 9/02041; G01B 9/0203; G01B 9/0201; G01B 9/02014;
(Continued)

(56) References Cited

U.S. PATENT DOCUMENTS 4,913,550 A 4/1990 Montgomery et al.
5,166,742 A 11/1992 Kobayashi et al.
(Continued)

FOREIGN PATENT DOCUMENTS

CN 101023377 A 8/2007
CN 103983341 8/2014
(Continued)

OTHER PUBLICATIONS

Z. Zalevsky and D. Mendlovic, "Optical implementation of the Bode transform," Appl. Opt. 34, 828-831 (1995).
(Continued)

*Primary Examiner* — Hwa Andrew Lee
(74) *Attorney, Agent, or Firm* — Browdy and Neimark, P.L.L.C.

(57) ABSTRACT

The invention relates to a method and system for monitoring at least one parameter of an object. There is provided an imaging system for monitoring at least one parameter of movement of a moving object, the system comprises at least one imaging unit comprising an optical transformer configured and operable for applying spatial image space transformation of at least one parameter of movement into geometric relation, by translating different components of six degrees of freedom of movement in a three-dimensional space into a lateral translation; wherein the imaging unit is (Continued)

configured and operable for imaging the moving object on an image plane and generating image data indicative of the moving object in an x-y plane; the imaging system generating motion data indicative of the six degrees of freedom of movement.

21 Claims, 12 Drawing Sheets

(51) Int. Cl.
    *G01H 9/00*      (2006.01)
    *G01P 3/38*      (2006.01)

(52) U.S. Cl.
    CPC ..... *G01B 9/02014* (2013.01); *G01B 9/02041* (2013.01); *G01B 9/02045* (2013.01); *G01H 9/00* (2013.01); *G01P 3/366* (2013.01); *G01P 3/38* (2013.01); *G01B 2290/45* (2013.01)

(58) Field of Classification Search
    CPC . G01B 9/02045; G01B 2290/45; G01P 3/366; G01P 3/38; G01H 9/00
    See application file for complete search history.

(56) References Cited

U.S. PATENT DOCUMENTS

| | | | |
|---|---|---|---|
| 5,361,131 A | 11/1994 | Tekemori et al. | |
| 5,841,030 A | 11/1998 | Honsberg et al. | |
| 5,907,404 A * | 5/1999 | Marron | G01J 9/02 356/489 |
| 6,248,994 B1 | 6/2001 | Rose et al. | |
| 6,452,683 B1 | 9/2002 | Kinrot | |
| 2004/0233459 A1 | 11/2004 | Booth | |
| 2007/0108978 A1 | 5/2007 | MacFarlane et al. | |
| 2007/0177772 A1 | 8/2007 | Fujii et al. | |
| 2008/0316496 A1 | 12/2008 | Meldahl et al. | |
| 2010/0168585 A1 | 7/2010 | Fujii et al. | |
| 2010/0226543 A1 | 9/2010 | Zalevsky et al. | |
| 2017/0122721 A1 | 5/2017 | Huang et al. | |

FOREIGN PATENT DOCUMENTS

| | | |
|---|---|---|
| CN | 104457581 A | 3/2015 |
| CN | 104776907 A | 7/2015 |
| DE | 4108944 A1 | 9/1992 |

OTHER PUBLICATIONS

Zalevsky, D. Mendlovic and G. Shabtay, "Transformations in optics: Novel perspectives, approaches, applications and implementations," J. of Opt. & Quant. Elect. 34, 1175-1181 (2002).

D. Sazbon, Z. Zalevsky, E. Rivlin and D. Mendlovic, "Using Fourier/Mellin-based correlators and their fractional versions in navigational tasks," Journal of Pattern Recognition, vol. 35 (12), pp. 2993-2999 (2002).

Wang et al., Image Processing Technology of Speckle Displacement Information and Its Application, China Academic Journal Electronic Publishing House, 21(3):1006-1576 (2002).

Valera et al., Combined fibre optic laser velocimeter and electronic speckle pattern interferometer with a common reference beam, Meas. Sci. Technol., 4:578-582 (1993).

* cited by examiner

OPTICAL TRANSFORMING AND MODULATED INTERFERENCE PATTERN OF A MOVING OBJECT

TECHNOLOGICAL FIELD

The present invention relates to a method and system for monitoring at least one parameter of a moving object.

BACKGROUND

For many applications, such as robotics, vehicle navigation, computer game applications, medical applications and other problem domains, it is valuable to be able to track motion comprising 3D position (and optionally also orientation) of a device as it moves in a known environment. Orientation and position of a device is known and may comprise six degrees of freedom (three of translation and three of rotation).

Existing approaches for tracking 3D position of an object in an environment, such as time of flight camera systems, structured light camera systems, fiducial marker systems, global positioning systems and others are often best suited for coarse levels of detail. Existing equipment for fast and/or fine-grained tracking of objects requires considerable fixed infrastructure and is typically cost-prohibitive for most consumers.

A speckle pattern is a micro-pattern of illumination generated by a coherent light source, such as a laser, when it passes through a diffuser or when it scatters from a surface which has irregularities larger than the wavelength of the illumination. Streams of laser speckle images are used in some types of computer mice to calculate 2D velocity vectors tracking motion of the mouse. Disparities between corresponding speckles in images of the same speckle pattern taken at different times give information about 2D displacement.

GENERAL DESCRIPTION

The invention relates to a method and system for monitoring at least one parameter of an object. Here, "object" may be a single element, a subject, a body's part of at least one individual people, or a group of elements or subjects or a surface thereof. The body's part may be a passive soft tissue. The object may be a back reflecting surface being uniform or not. The parameters may be physiological parameters/conditions of an individual. According to a broad aspect of the present invention, there is provided an imaging system for monitoring at least one parameter of movement of a moving object, the system comprises at least one imaging unit comprising an optical transformer configured and operable for applying spatial image space transformation of at least one parameter of movement into geometric relation, by translating different components of six degrees of freedom of movement in a three-dimensional space into a lateral translation; wherein the imaging unit is configured and operable for imaging the moving object on an image plane and generating image data indicative of the moving object in an x-y plane; the imaging system generating motion data indicative of the six degrees of freedom of movement. Therefore, the imaging unit is configured to generate x-y plane information and to apply direct transformation of movement within the object into an imaging plane.

In some embodiments, the optical transformer applies at least one of Fourier transform, Mellin transform, coordinate transform such as Cartesian coordinates transform into (log (r), θ) when r is a radial coordinate and θ is an angular coordinate or circular harmonic transform.

Generally, a motion of a surface can be split into such components as transversal motion, axial motion, and tilt (the axis connects the surface of interest with the imaging unit). In some embodiments, the technique of the invention has an enhanced sensitivity to the tilt, which on the imager sensing plane (PDA) primarily causes speckle pattern shifting. The transversal motion of the surface of interest causes shifts and changes of the speckle pattern image, but in cases when imaging utilizes focusing on a displaced (e.g. forward or downward displaced) plane (i.e. unfocused image) thus caused shifts are often significantly smaller than the shifts caused by the tilt. In this specific case, the spatial image space transformation is a Fourier transformation. The full change of the parameter of interest is then determined by determining a shift of a speckle pattern in a six-coordinate space. Therefore, in some embodiments, the imaging unit is selectively operable to provide an unfocused image of the object in the object plane, collect a sequence of secondary speckle patterns and determine at least one shift between regions of the object which appear in the sequence of secondary speckle patterns, to thereby provide motion data indicative of motion of the object along a tilt dimension and image data in an x-y plane. The unfocused imaging may be performed by the imaging unit configured for imaging the moving object on an image plane, or by another imaging unit being unfocused on the object in the object plane.

In some embodiments, the system further comprises a pinhole for collecting a portion of the secondary speckle patterns.

According to another broad aspect of the present invention, there is provided an imaging system for monitoring at least one parameter of movement of a moving object, the system comprises an imaging unit comprising a detector having certain detection sessions; a source of at least partially coherent light generates a beam of at least partially coherent light having a predetermined frequency modulation. The frequency modulation of the source is selected to overcome the detector limited frame per second rate, due to the increased frequency changes of the interference fringe pattern. Moreover, the frequency modulation of the source is selected with respect to the frequency range of the surface movement of the object. Preferably, the coherent illumination is in the form of pulsed light having a modulation frequency selected to enable correlation between illumination and detection sessions (sampling rate). Therefore, the pulsation of the source allows the detection of fast vibrations by slow camera.

According to another broad aspect of the present invention, there is provided an imaging system for monitoring at least one parameter of movement of a moving object, the system comprises an imaging unit comprising a detector; an interferometric module configured and operable to detect an interference pattern indicative of phase shifts of the object being indicative of temporal changes along a z-axis; the interferometric module comprises at least one beam splitter/combiner configured for receiving at least partially coherent light beam, splitting the beam into object and reference beams propagating along substantially identical optical paths; and at least one mirror arrangement located in the reference beam path and configured for reflecting the reference beam towards the detector through the beam splitter/combiner where it interferes with an object response to interaction with the object beam, wherein the at least one mirror arrangement is configured for displacement at a predetermined frequency to induce controllable temporal modulation of the interference pattern. The interferometric module provides an interference pattern indicative of temporal changes at a surface of the object in the z-axis. Preferably, a Mach-Zehnder interferometer is used.

The interferometric module may be a stand alone module of the imaging system or may be integrated in the imaging unit.

In some embodiments, the system comprises an illumination source generating a beam of at least partially coherent light having a predetermined frequency modulation. The frequency modulation of the source is selected to overcome the detector limited frame per second rate, due to the increased frequency changes of the interference fringe pattern. Moreover, the frequency modulation of the source is selected with respect to the frequency range of the surface movement. Preferably, the coherent illumination is in the form of pulsed light having a modulation frequency selected to enable correlation between illumination and detection sessions (sampling rate). Therefore, the pulsation of the source allows the detection of fast vibrations by slow camera.

In some embodiments, the system comprises a filter placed in the reference path and configured for equalizing intensities of light propagating along the reference and object paths.

In some embodiments, the system comprises a feedback circuit placed between the detector downstream of the reference path, the feedback circuit being configured for correcting frequency multiplication.

In some embodiments, the system is configured such that the tilt and z-axis data are concurrently obtained on the same imaging unit/detector. To this end, the imaging unit utilizes the object path as an imaging channel to produce unfocused image of the object by receiving a reflected secondary speckle pattern originated at the object (due to movement/vibrations in at least a part of the object) and provides image data indicative of the changes in the speckle pattern in the x-y plane, i.e. tilt with respect to x-y plane. Alternatively, the collection of the tilt and z-axis data can be time separated. The mirror of the interferometric module may be controllably moved to induce controllable temporal modulation of the interference pattern. This enables to separate between the tilt and z-axis data in the detected image.

Thus, in some embodiments, the technique provides a detection of a surface movement in the x-y plane having a tilt component with the detection of temporal changes of the surface in the z-axis. The technique of the present invention combines imaging of a coherent speckle pattern of a surface movement with detection of interference changes being indicative of vibrations of the surface in the z-axis at the same scan time. The technique includes imaging of a coherent speckle pattern formed by an object or subject or, generally, a surface of interest. The pattern can be formed by illumination of the still or moving surface of interest by coherent light of a laser or another light source. The surface movement can be for example of vibration type. The vibration can be caused by a sound or vibration itself can produce a sound, thus making the motion of the surface of interest associated with the sound.

In some embodiments, the system comprises a support surface for supporting the object and applying a periodic stimulation to the object.

According to another broad aspect of the present invention, there is provided a method for monitoring at least one parameter of movement of a moving object, the method comprises applying a spatial image space transformation to at least one parameter of a movement into geometric relation, by translating different components of six degrees of freedom of movement in a three-dimensional space into a lateral translation; imaging the moving object on an image plane; and generating motion data being indicative of six degrees of freedom of movement.

According to another broad aspect of the present invention, there is provided a method for monitoring at least one parameter of movement of a moving object, the method comprises imaging the moving object on an image plane; detecting an interference pattern indicative of phase shifts of the object being indicative of temporal changes along a z-axis; and controllably inducing controllable temporal modulation of the interference pattern.

In some embodiments, the method comprises illuminating the moving object with at least partially coherent electromagnetic beam. A coherence length for the coherent beam may be selected to provide a desired ratio between a size of an illumination spot and size of the speckles in a captured set of patterns.

In some embodiments, the method comprises applying a stimulation field of a periodically changing stimulation frequency to an object.

In some embodiments, the method comprises concurrently imaging the interference pattern onto the imaging plane.

In some embodiments, the method comprises timely separating between the interference pattern and the motion data.

In some embodiments, the method comprises measuring at least one of velocity and frequency of the moving object along the z-axis.

In some applications, where the object is located behind certain surface (e.g. individual's body behind the clothes), the coherence length of illumination is selected to be shorter than a typical distance between the object and such surface. Therefore, in some embodiments, the method comprises separating between the moving object and a reflecting surface at least partially surrounding the object by selecting the coherence length of the at least partially coherent electromagnetic beam to be shorter than a typical distance between the object and the reflected surface.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
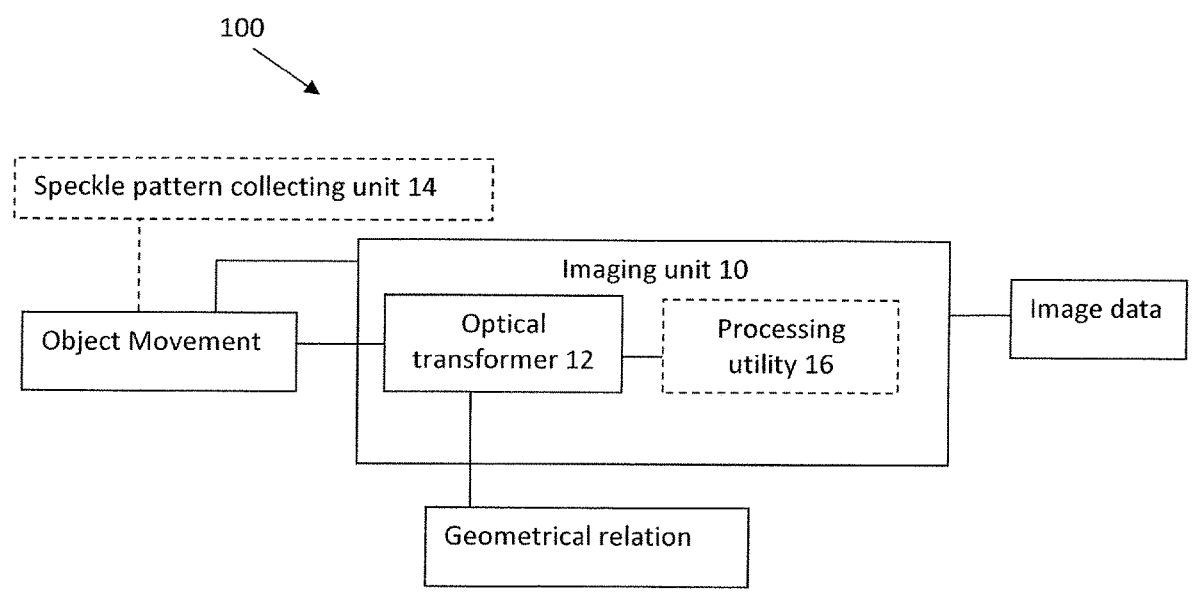
FIG. 1 represents a schematic illustration of the main modules of the imaging system of the present invention, according to a broad aspect of the present invention.

The position and orientation of a rigid body in space is defined by six degrees of freedom: three components of translation (x-, y-, and z-) and three components of rotation (roll-, pitch-, and yaw-rotations). Generally, a motion of a surface can be split into such components as transversal motion, axial motion, and tilt (the axis connects the surface of interest with the imaging unit). According to some embodiments of the present invention, to monitor at least one parameter of movement of the moving object, an optical transformation is applied to at least one parameter of a movement to provide a geometric relation between the parameter of the movement and a spatial image space, by translating different components of six degrees of freedom of movement in a three-dimensional space into a lateral translation. The moving object is then imaged on an image plane and motion data being indicative of six degrees of freedom of movement is generated. The optical transformation comprises at least one of Fourier transform, circular harmonic transform, Mellin transform, coordinate transform such as e.g. Cartesian (x,y) coordinates into (log(r), θ) when r is a radial coordinate and θ an angular coordinate. Reference is made to FIG. 1 representing a schematic illustration of the main modules of the imaging system of the present invention, according to a broad aspect of the present invention. The imaging system 100 is aimed at monitoring at least one parameter of movement of a moving object. The system 100 comprises at least one imaging unit 10 configured and operable for imaging the moving object on an image plane and generating image data indicative of the moving object in an x-y plane. The imaging unit 10 comprises an optical transformer 12 configured and operable for applying an optical transformation of at least one parameter of movement into geometric relation between the parameter of the movement and a spatial image space, by translating different components of six degrees of freedom of movement in a three-dimensional space into a lateral translation. The optical transformer 12 is configured and operable to convert different movement characteristics into geometric relations. The optical transformer 12 is an optical element, placed in the aperture plane of the imaging unit 10 configured to apply an optical transformation and to therefore detect the different components of the movement of the inspected tissue/object. Therefore, the imaging system 100 generates motion data indicative of the six degrees of freedom of movement. In some embodiments, the optical transformer 12 applies at least one of Fourier transform, Mellin transform, coordinate transform such as Cartesian coordinates transform into (log (r), θ) when r is a radial coordinate and θ is an angular coordinate or circular harmonic transform. Therefore, the system and method of the present invention provides modified optical transformations for remote sensing of six degrees of freedom of any general movement. The optical transformer 12 may be a coordinate transformation filter or any general linear optical transformer described for example in Z. Zalevsky and D. Mendlovic, "Optical implementation of the Bode transform," Appl. Opt. 34, 828-831 (1995), Zalevsky, D. Mendlovic and G. Shabtay, "Transformations in optics: Novel perspectives, approaches, applications and implementations," J. of Opt. & Quant. Elect. 34, 1175-1181 (2002), or in D. Sazbon, Z. Zalevsky, E. Rivlin and D. Mendlovic, "Using Fourier/Mellin-based correlators and their fractional versions in navigational tasks," Journal of Pattern Recognition, Vol. 35 (12), pp. 2993-2999 (2002).

In some embodiments, the imaging unit 10 is selectively operable to provide an unfocused image of the object in the object plane, collect a sequence of secondary speckle patterns and determine at least one shift between regions of the object which appear in the sequence of secondary speckle patterns, to thereby provide motion data indicative of motion of the object along a tilt dimension and image data in an x-y plane. The sequence of secondary speckle patterns is focused on a plane displaced from the moving object. The speckle pattern method is based upon temporal tracking of a secondary reflected speckle by imaging the speckle through properly defocused optics. The tilting changes of the object surface reflect the movement of the speckle pattern in the x-y plane. In this specific case, the spatial image space transformation is a Fourier transformation (far field defocused imaging) which converts tilting changes into movement of the speckle patterns.

Alternatively, the system 100 comprises a speckle pattern collecting unit 14 being unfocused on the object in the object plane and collecting a plurality of sequential secondary speckle patterns thereby generating data indicative of an image of the object in an x-y plane and determining at least one shift between regions of the object which appear in at least first and second images of the object, to thereby provide data indicative of motion of the object along a tilt dimension and image data in an x-y plane.

The imaging unit 10 may comprise a processing utility 16 configured to determine the shift between the sequence of secondary speckle patterns and provide motion data indicative of motion of the object along a tilt dimension and image data in an x-y plane. The processing utility 16 may be a DSP, microcontroller, FPGA, ASIC, etc., or any other conventional and/or dedicated computing unit/system. The term "processing utility" should be expansively construed to cover any kind of electronic device with data processing capabilities, including, by way of non-limiting example, personal computers, servers, computing systems, communication devices, processors (e.g. digital signal processor (DSP), microcontrollers, field programmable gate array (FPGA), application specific integrated circuit (ASIC), etc.) and other electronic computing devices. The processor utility may comprise a general-purpose computer processor, which is programmed in software to carry out the functions described hereinbelow. Although processing utility 16 is shown in FIG. 1, by way of example, as an integrated unit of the imaging unit 10, some or all of the processing functions of processing utility 16 may be performed by suitable dedicated circuitry within the housing of the imaging unit 10 or otherwise associated with the imaging unit 10 or may be a separate stand alone utility. Unless specifically stated otherwise, as apparent from the following discussions, it is appreciated that throughout the specification discussions utilizing terms such as "processing", "computing", "calculating", "determining", "comparing" or the like, refer to the action and/or processes of a computer that manipulate and/or transform data into other data, the data represented as physical, e.g. such as electronic, quantities. Also, operations in accordance with the teachings herein may be performed by a computer specially constructed for the desired purposes or by a general purpose computer specially configured for the desired purpose by a computer program stored in a computer readable storage medium. The software may be downloaded to processing utility 16 in electronic form, over a network, for example, or it may alternatively be provided on tangible media, such as optical, magnetic, or electronic memory media. Alternatively or additionally, some or all of the functions of the processing unit 16 may be implemented in dedicated hardware, such as a custom or semi-custom integrated circuit or a programmable digital signal processor (DSP).

Therefore, the system and the method of the present invention provide a remote sensing of six degrees of freedom of any general movement. As described above, the imaging unit 10 or the speckle pattern collecting unit 14 are selectively operable to provide an unfocused image of the object in the object plane (far field imaging). The processing utility 16 analyses the temporal changes of the speckle patterns and convert the movement of the speckles into the tilting information of the movement while the x-y information as well as the z-axis movement will not modify the speckle patterns. On the other hand if focused image of the object is performed by the imaging unit 10 (not speckles but regular imaging), then the x-y movement and probably also the z-axis movement (depends on the scale of the image) can be determined. In some embodiments, the imaging system 100 provides a modified sensing system having two image channels having both a defocused image in which the speckle patterns are analyzed and a regular focused image of the object (regular image and not speckle patterns analysis). The combination of the far field speckle pattern and of a near field image (use of two images) provides the capability to extract more information about the movement characteristics. The near field image gives information about movement in the x-y plane and possible also about z-axis movement and the far field speckle pattern analysis gives angular tilting dimension.

Figure 2A:
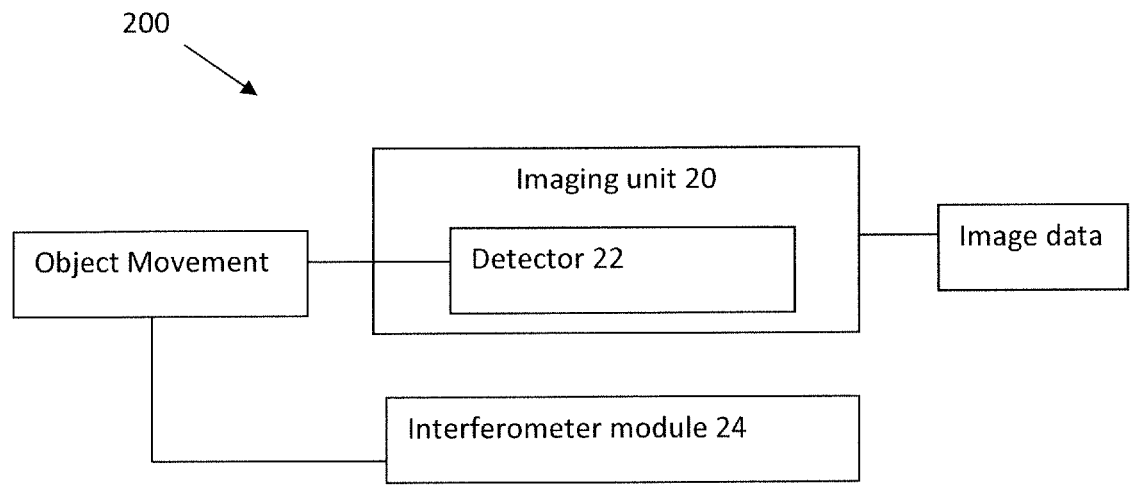
FIG. 2a represents a schematic illustration of the main modules of the imaging system of the present invention, according to another broad aspect of the present invention.

Another technique to monitor at least one parameter of movement of the moving object comprises imaging the moving object on an image plane; detecting an interference pattern indicative of phase shifts of the object being indicative of temporal changes along a z-axis; and; controllably inducing controllable temporal modulation of the interference pattern. In this connection, reference is made to FIG. 2a representing a schematic illustration of the main modules of the imaging system of the present invention, according to another broad aspect of the present invention. The imaging system 200 comprises an imaging unit 20 comprising a detector 22 and an interferometric module 24 configured and operable to detect an interference pattern indicative of phase shifts of the object being indicative of temporal changes along a z-axis. In order to achieve a full surface movement data, the interferometric module 24 is used to detect the temporal changes of the surface in the z-axis. Although, for the sake of simplicity the interferometric module 24 is represented as a stand alone unit, which may comprise its own detector as illustrated for example in FIG. 3, the interferometric module 24 may be integrated with the imaging unit 20 such that the interference pattern is concurrently imaged onto an imaging plane of the imaging unit 20. Therefore, in some embodiments, imaging unit 20 comprises interferometric module 24. A Mach-Zehnder interferometer configuration can be used. The at least partially coherent light beam is split into two similar paths when only one path is reflected from the moving object. The result is phase shifts between the two beams caused by a change in length of one of the paths. Those phase shifts create the interference pattern (fringes). The vibration of the surface in the z-axis changes the path length of one of the Mach-Zehnder laser paths. These changes reflect in the interference pattern (fringes) of the two joined beams on the detector and camera plane. The number of wavelength contained in the path's length difference changes the fringes oscillating frequency. Using laser Doppler vibrometer (LDV) technique the velocity of the object surface vibration in the z-axis is measured. The vibration velocity and frequency are extracted from the Doppler shift of the reflected partially coherent beam due to the motion of the surface as will be detailed further below. Therefore, the technique of the present invention measures at least one of velocity and frequency of the moving object along the z-axis to thereby enable to timely separating between the interference pattern and the motion data.

Figure 2B:
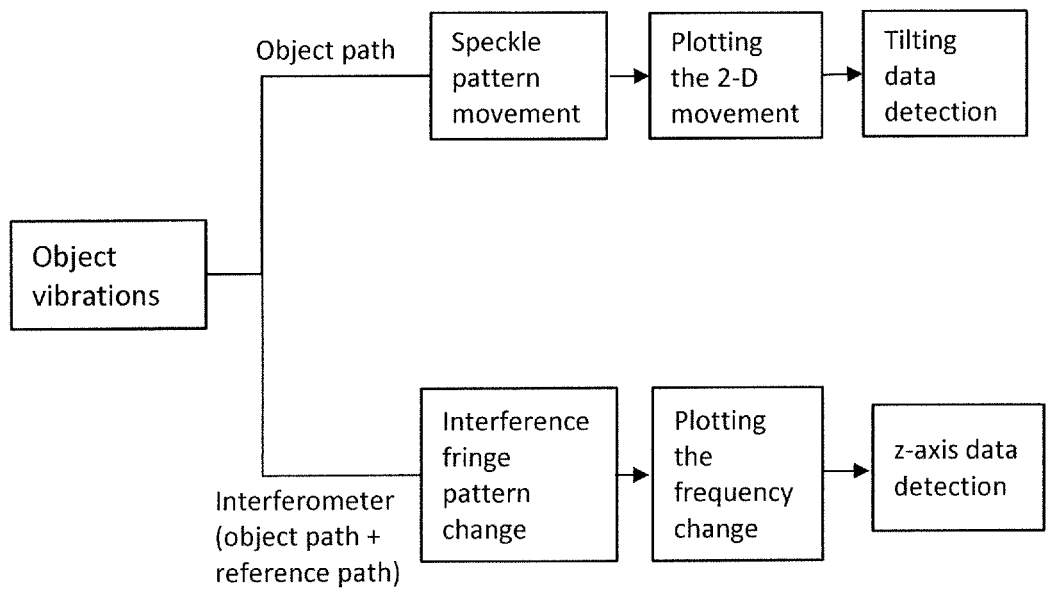
FIG. 2b represents a specific and non-limiting schematic illustration of the operation of a possible configuration of the imaging system according to some embodiments of the present invention.

Reference is made to FIG. 2b, representing a specific and non-limiting schematic illustration of the operation of a possible configuration of the imaging system according to some embodiments of the present invention. In this configuration, the imaging system receives an at least partially coherent light beam being indicative of at least one parameter of movement of a moving object. The at least partially coherent light beam is separated in two paths: an object path and a reference path. The at least partially coherent light beam of the object path is received by the imaging unit being selectively operable to provide an unfocused image of the object in the object plane which generates motion data indicative of motion of the object along a tilt dimension. As described above, in some embodiments, the method comprises positioning the imaging unit to provide an unfocused image of the object in the object plane and collecting at the imaging unit a sequence of secondary speckle patterns and determining at least one shift between regions of the object appearing in the sequence of secondary speckle patterns. The imaging unit may thus be selectively operable to provide an unfocused image of the object in the object plane, collect a sequence of secondary speckle patterns and determine at least one shift between regions of the object which appear in the sequence of secondary speckle patterns, to thereby provide motion data indicative of motion of the object along a tilt dimension and image data in an x-y plane. The sequence of secondary speckle patterns is focused on a plane displaced from the moving object. The speckle pattern method is based upon temporal tracking of a secondary reflected speckle by imaging the speckle through properly defocused optics. The tilting changes of the object surface reflect the movement of the speckle pattern in the x-y plane. The object path and the reference path are introduced into an interferometric module configured and operable to detect an interference pattern indicative of phase shifts of the object being indicative of temporal changes along a z-axis.

Figure 3:
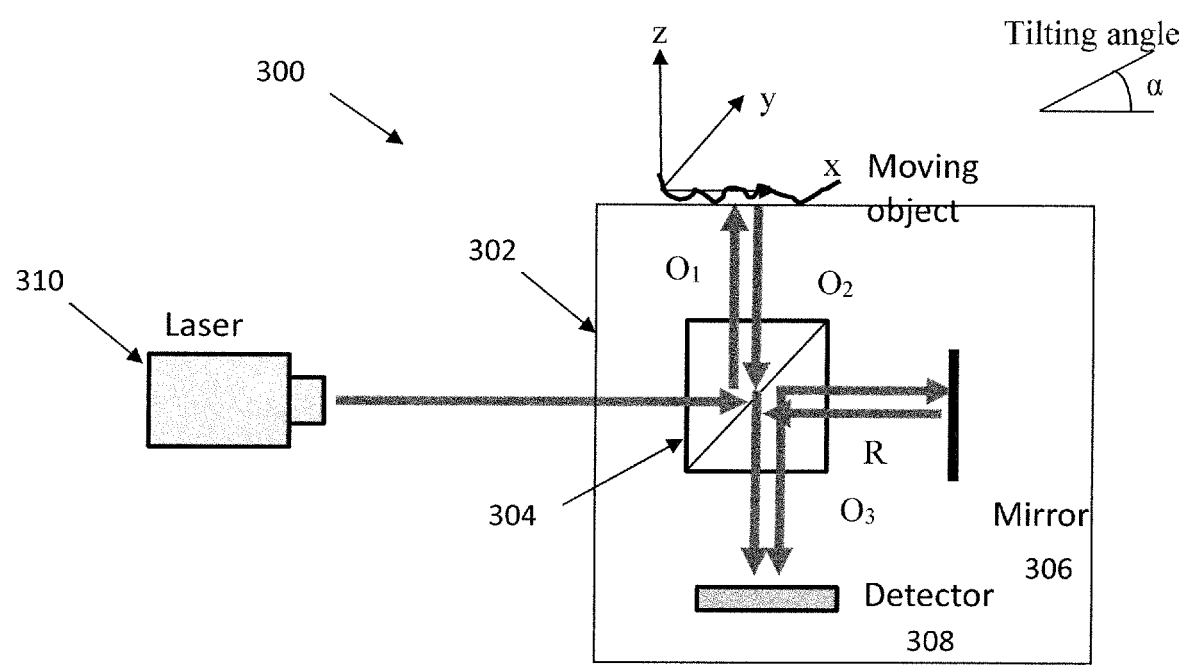
FIG. 3 representing an example of a configuration of the imaging system according to some embodiments of the present invention.
Figure 4:
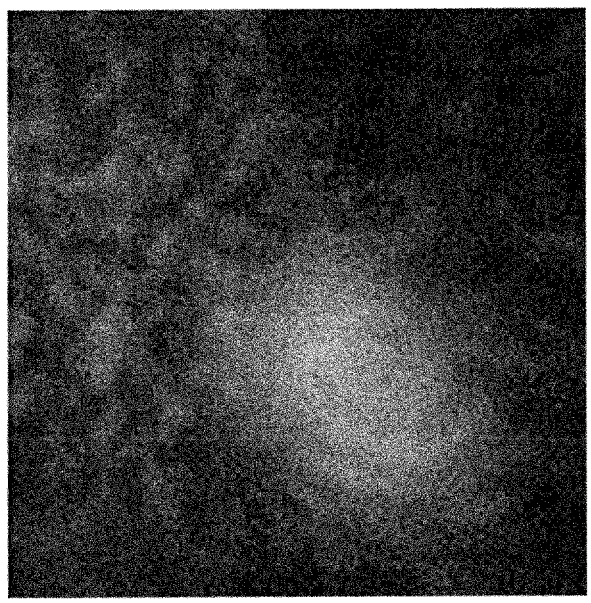
FIG. 4 shows speckle pattern and the fringes pattern.

Reference is made to FIG. 3 representing an example of a configuration of the imaging system according to some embodiments of the present invention. In this example, the imaging system 300 comprises an interferometer module 302 including at least one beam splitter/combiner 304 configured for receiving at least partially coherent light beam, splitting the beam into object and reference beams noted $O_1$ and R respectively propagating along substantially identical optical paths and at least one mirror arrangement 306 located in the reference beam path and configured for reflecting the reference beam R towards a detector 308 through beam splitter/combiner 304 where it interferes with an object response noted $O_3$ to interaction with the object beam. The imaging system 300 may include a source of at least partially coherent light 310. The speckle pattern and the fringes pattern are shown in FIG. 4.

Figure 5:
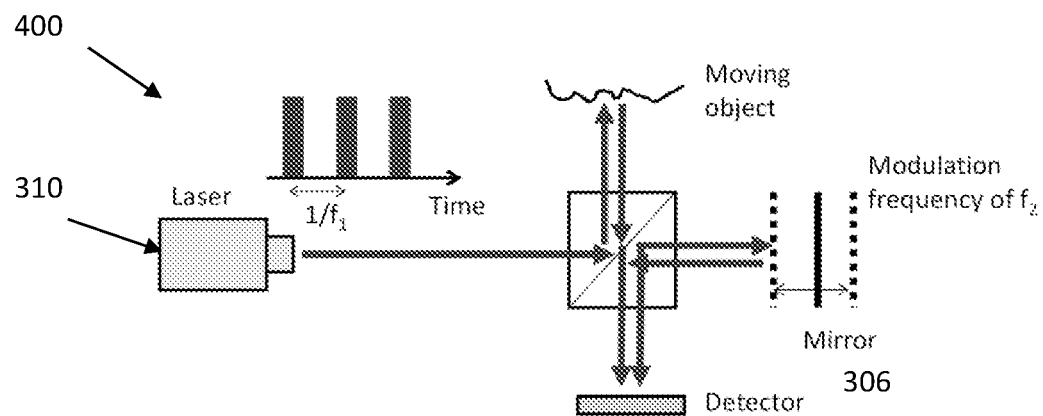
FIG. 5 represents an optical configuration of an embodiment of the imaging system in which the mirror arrangement is configured for displacement at a predetermined frequency to induce controllable temporal modulation of the interference pattern.

Reference is made to FIG. 5 illustrating an optical configuration of an embodiment of the imaging system 400 in which the mirror arrangement 306 is configured for displacement at a predetermined frequency $f_2$ to induce controllable temporal modulation of the interference pattern. Additionally or alternatively, the illumination source 310 may generate pulsed light having a modulation frequency $f_1$ selected to enable correlation between illumination and detection sessions.

In this connection, it should be understood that as described above, the secondary speckle patterns created by direct illumination of an object are acquired for extracting tilting information. In order to monitor the tilting vibration, the correlation of each of the sequential speckles images is measured. By analyzing the changes in the correlation peak position, relative tilting movement of the object is extracted. The relative shift β of the speckle pattern is proportional to the change in the spatial position of the speckle pattern due to the object temporal tilting movement:

$$\beta = \frac{4\pi \tan\alpha}{\lambda} \approx \frac{4\pi\alpha}{\lambda} \quad (1)$$

where α is the time varying tilting angle of the object illuminated surface, λ is the illumination wavelength. The temporal tilting movement of the object is proportional to the change in the speckle pattern.

Moreover, an interferometer operated with phase shift measurements provides z-axis information. Therefore, in order to monitor the z-axis vibration interference, behavior measurements were used. The constructive and destructive interferences pattern of the fringes imaging is according to the length difference between the two paths:

$$\text{Constructive interference: } \Delta L = \pm n\lambda \quad (2)$$

$$\text{Destructive interference: } \Delta L = \pm\left(n + \frac{1}{2}\right)\lambda$$

where ΔL is the two paths length difference, n is the number of the illumination wavelength. By analyzing the movement in the fringes imaging, the changes in the velocity of the object's path can be extracted. The number of the illumination wavelength in the length difference multiple the frequency movement of the fringes pattern imaging. For example, for object movement of ΔL=1 mm with frequency of about 1-2 Hz (like heart bits) and laser wavelength illumination of about 532 nm, the fringes pattern movement will be in the frequency range of about 1880-3760 Hz.

This situation of frequency multiplication leads to a problem of detector limited frame rate. In order to solve this problem, a modulation of the illumination source can be used. The modulation frequency is such that the difference between it and the object frequency bandwidth is in the detector limited frame rate:

$$\cos(\lambda f_3 kt)\cos(\lambda f_2 kt) = \frac{\cos(f_3 - f_2)\lambda kt + \cos(f_3 + f_2)\lambda kt}{2} \quad (3)$$

where $f_{3,2}$ are the frequency of the object and the laser respectively, k is the wave number.

Figure 6:
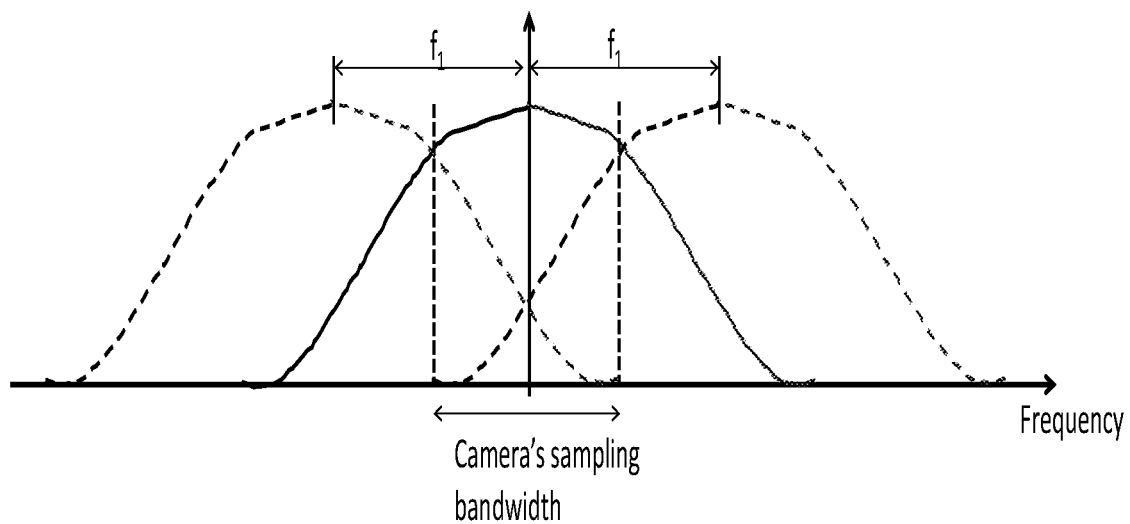
FIG. 6 shows the correlation between illumination and detection sessions in which spectral replications of the detection sessions are acquired due to pulses of the laser.

Therefore the imaging system of the present invention is capable to perform pulsation of the illumination source at frequency $f_1$ and/or modulation of the interferometer mirror at frequency of $f_2$. As described above, when the imaging unit provides an unfocused image of the object in the object plane, a sequence of secondary speckle patterns are collected at the detector plane. It should be understood that generally a speckle pattern has a frequency of $\mu_1$ and fringes of the interference pattern has a frequency of $\mu_2$. If the illumination source 310 and the interferometric mirror arrangement 306 are modulated at frequencies of $f_1$ and $f_2$ respectively, the following is obtained: the fringe would move at a frequency of $\mu_2+f_1+f_2$ and the speckle at a frequency of $\mu_1+f_1$. The correlation between the illumination and detection sessions is illustrated in FIG. 6 in which spectral replications of the detection sessions are acquired due to the pulses of the laser. The result shows that a low sampling rate detector e.g. even a detector operating at regular video rate (e.g. 50 or 60 fps) can be used (and thus many pixels in space can be used and a large field of view analysis can be performed) since the illumination source performs optical down conversion of the spectral distribution to the low band region (because it realizes optical sampling procedure) and the frequency of the mirror $f_2$ together with the spatial information allows to separate between the tilting and the axial movements. FIG. 6 schematically demonstrates how due to the pulsation of the illumination source 310 high temporal frequencies e.g. frequencies of few KHz can be down converted to allow their sampling with a slow rate detector e.g. one that operates at rate of few hundred of Hz. It can be seen how the high frequencies are folded into the low frequency spectral band sampled by the detector. Therefore, this embodiment of the imaging system provides a modified interference based configuration for remote sensing of six degrees of freedom of any general movement.

Figure 7:
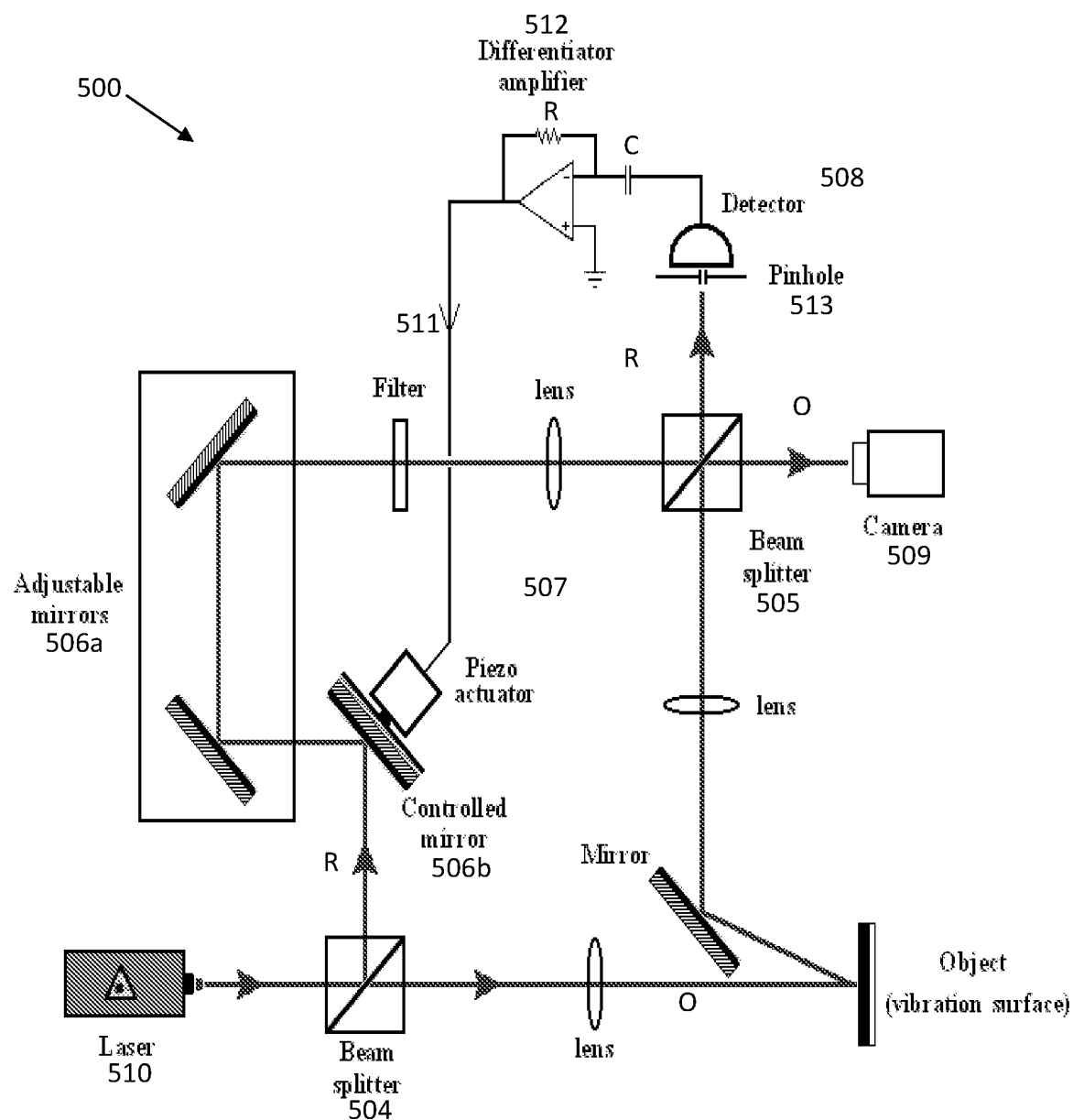
FIG. 7 represents a specific and non-limiting example of an imaging system of the present invention.

Reference is made to FIG. 7 representing a specific and non-limiting example of an imaging system of the present invention. The imaging system 500 comprises inter alia an illumination source 510 generating an at least partially coherent light beam. In this example, the imaging system 500 also comprises a beam splitter 504 configured for receiving at least partially coherent light beam, splitting the beam into object and reference beams noted O and R respectively propagating along substantially identical optical paths and a mirror arrangement located in the reference beam path and including in this example three adjustable mirrors noted as 506a and 506b. Adjustable mirrors 506a are configured for reflecting the reference beam R towards a camera 509 where it interferes with an object response noted O to interaction with the object beam through a second beam splitter/combiner 505. The mirror arrangement can change the length of the reference path in order to calibrate the interferometer with two similar paths and according with its coherence length. Since the at least partially coherent light beam in the reference path gets to the camera 509 directly, while the at least partially coherent light beam in the object path is acquired by reflection from the object, thus the intensities of the at least partially coherent light beams from the two paths on camera 509 are not the same. For that reason a filter 511 may be placed in the reference path to equal the two path intensities of light propagating along the reference and object paths. The imaging system 500 also comprises a detector 508. It should be noted that in this specific and non-limiting example, camera 509 is configured and operable to monitor the tilting shift by tracking the speckle movement (or imaging the object), while detector 508 is configured and operable to monitor the axial movement of the object. These two functions may be performed by the same imaging element. The detector 508 is configured to receive/collect the speckle patterns and the interference fringes in order to perform the movement estimation. In order to detect only small area of the speckle pattern and the fringes pattern, a pinhole 513 may be used for collecting a portion of the secondary speckle patterns and may be attached to the detector 508. In this example the pinhole is of 200 µm. In this example, system 500 further comprises a feedback circuit 512 placed between detector 508 downstream of the reference path. Feedback circuit 512 is thus placed from the detector 508 back to the reference path and is configured for correcting frequency multiplication. It should be understood that for stabilization of the fringes pattern imaging, the frequency multiplication caused by the number of wavelengths contained in the object path difference should be corrected. The feedback circuit 512 comprises a differentiator amplifier through which the output signal from the detector 508 passes with negative feedback. The differentiator amplifier may be powered by a DC power supply. The output derived signal from the amplifier derived an analogue amplifier driver controls a piezoelectric actuator 507 attached to a controlled mirror 506*b* of the mirror arrangement 506 in the reference path. The controlled mirror movement compensates the instability of the frequency multiplication due to the number of wavelength in the path length changes. In some embodiments, the system 500 comprises a support surface for supporting the object and applying a periodic stimulation to the object. In this way, a stimulation field of a periodically changing stimulation frequency can be applied to an object.

In some embodiments, the illumination source 510 is controlled to select a coherence length for the at least partially coherent beam to provide a desired ratio between a size of an illumination spot and size of the speckles in a captured set of patterns. In this way, the system 500 enables the separation between different movements of the various components of the object. More generally, by using a degree of partial coherence and/or a plurality of wavelengths more information about the inspected object (e.g. having a back reflecting surface) may be extracted. In this connection, it should be understood that when, for example, an inspected subject wears clothing such as a shirt, back reflections of the laser beam are originated from the surface of the shirt as well as from the tissue of his body underneath the shirt (e.g. from his chest). Each of such back reflections produces its own speckle pattern and since each one of the two back reflecting surfaces can move independently, the two different speckle patterns and their time varying characteristics mix and do not allow proper analysis or separation between the movement of the two different types of surfaces. The technique of the present invention generates such a separation by using a controlled partial coherence of the illumination source 501 (spatial or temporal). The coherence length of the at least partially coherent beam may be selected to be shorter than the distance between the tissue and the shirt to prevent the interference between the two different speckle patterns. The two different speckle patterns can be separate via image processing as each one of them has different temporal dynamics. This may be implemented by the processing utility 16 shown in FIG. 1. Therefore, the technique of the invention comprises separating between the moving object and a reflecting surface at least partially surrounding the object by selecting the coherence length of the at least partially coherent electromagnetic beam to be shorter than a typical distance between the object and the reflected surface.

Alternatively or additionally two or more wavelengths may be used. Since each wavelength has a different penetration depth into a tissue or a shirt, the speckle patterns obtained at each one of the two or more wavelengths have different mixture. As different linear mixture coefficients exist for each wavelength, the two different types of patterns (coming from the tissue and coming from the shirt) are separable via image processing after capturing sufficient time varying information. Therefore, the technique of the invention comprises separating between the moving object and a reflecting surface at least partially surrounding the object by generating at least two wavelengths having different linear mixture coefficients.

In the set up tested by the inventors of the present invention, the illumination source 510 was a laser diode of the firm Photop Suwtech of the type DPGL-2100F having a wavelength of 532 nm and a power of max 300 mW operated with a driver (Photop LDC-2500S); the detector 508 was a Si switchable gain detector of the type Thorlabs PDA100A-EC, 340-1100 nm, 2.4 MHz BW, 100 mm2; the camera 509 was of the type PixelLink PL-B761U; the piezoelectric actuator 507 was a low voltage piezoelectric actuator controlled by an analogue amplifier of the type Piezomechanik SVR 1000-1; the DC power supply powering the differentiator amplifier was of the type Lion LE-3003D-3; the support surface was a speaker of the type OSC LS13C050, 2¼" Diameter, 50 ohm 0.5 Watt controlled by a signal generator (Tektronix AFG1022). The system 500 also comprise another mirror for redirecting the object beam, three lenses for focusing the reference and object beams, two xyz stages, one x stage and dual neutral-density (ND) filter wheel.

The inventors of the present invention have made some experiment to test the illumination source frequency modulation using an open circuit without feedback. As described above, according to a broad aspect of the present invention, there is provided an imaging system for monitoring at least one parameter of movement of a moving object, the system comprises an imaging unit comprising a detector having certain detection sessions and a source of at least partially coherent light generating a beam of at least partially coherent light having a predetermined frequency modulation. The frequency modulation of the source is selected to overcome the detector limited frame per second rate, due to the increased frequency changes of the interference fringe pattern. Moreover, the frequency modulation of the source is selected with respect to the frequency range of the surface movement of the object. Preferably, the coherent illumination is in the form of pulsed light having a modulation frequency selected to enable correlation between illumination and detection sessions (sampling rate). Therefore, the pulsation of the source allows the detection of fast vibrations by slow camera. The laser parameters were as follows: the wavelength was about 532 nm, the power (on detector and camera) was in the range of about 5-13µ; the driver current was about 0.35 A; the modulation signal was about 25% on pulse; the frequency range was about 0-220 Hz; the voltage (Pk2Pk) was about 10 V and the offset was about 0 V. The detector parameters were as follows: the gain set was about 40 dB, the bandwidth was about 225 kHz; the FFT Offset was about −110 dBV. The object parameters were as follows: the object signal was a sinusoidal signal, the frequency range was about 0-220 Hz; the voltage (Pk2Pk) was about 10 V and the offset was about 0 V.

Figure 8A:
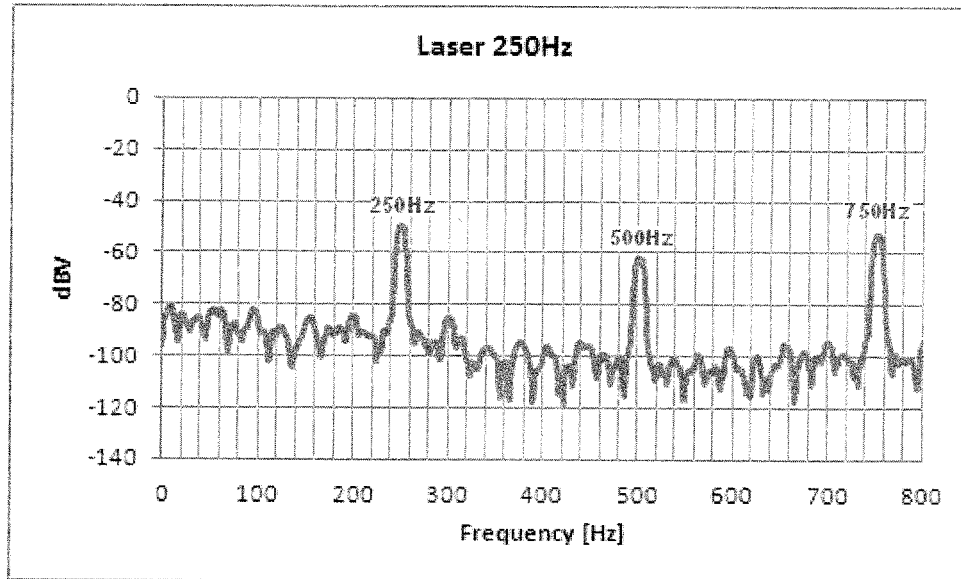
FIGS. 8a-8g show laser modulation results.
Figure 8B:
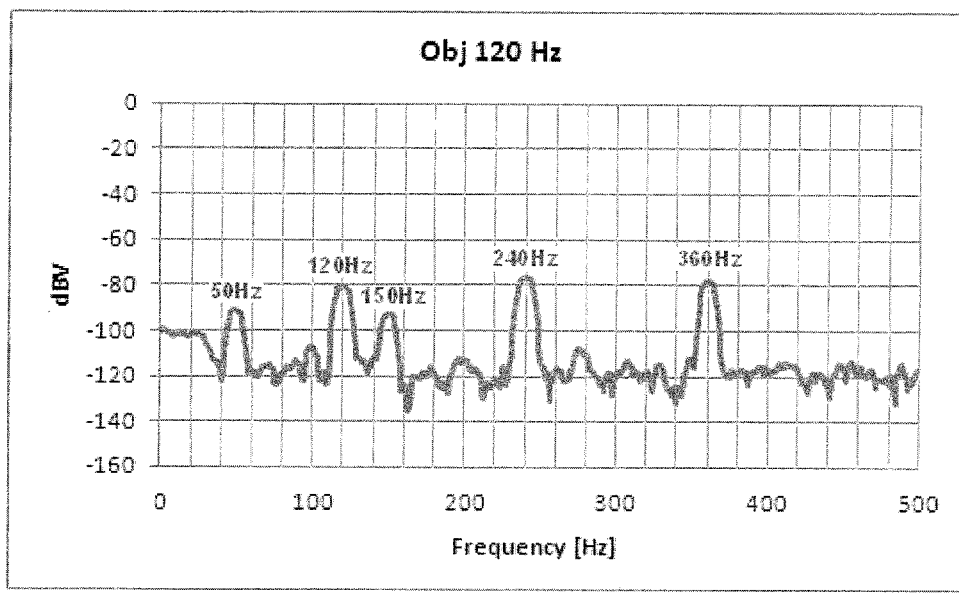
Figure 8C:
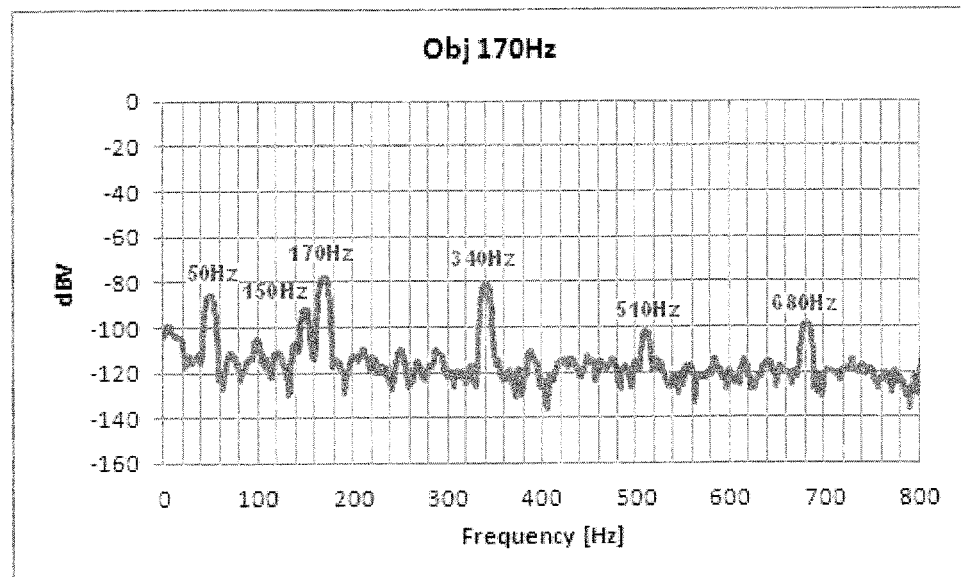
Figure 8D:
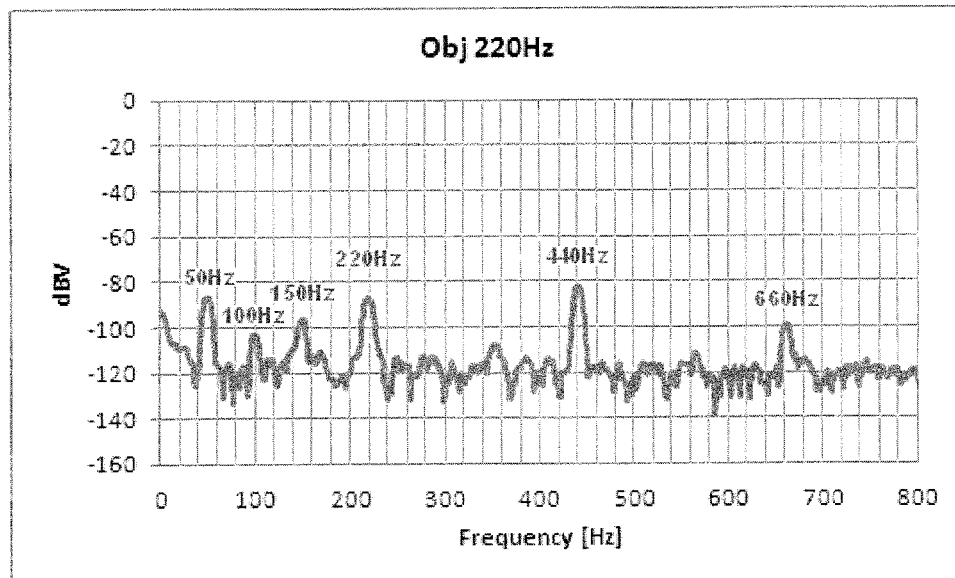
Figure 8E:
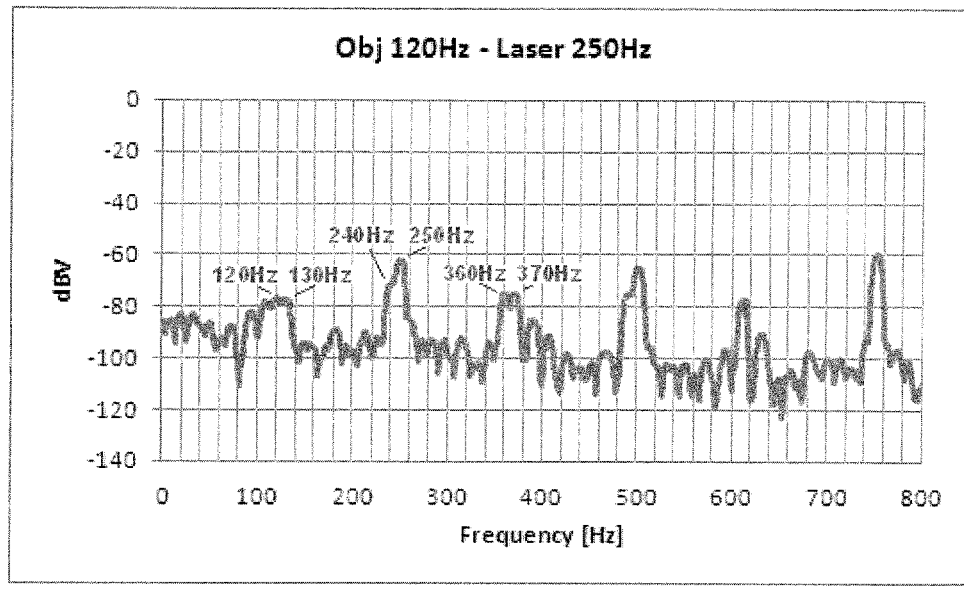
Figure 8F:
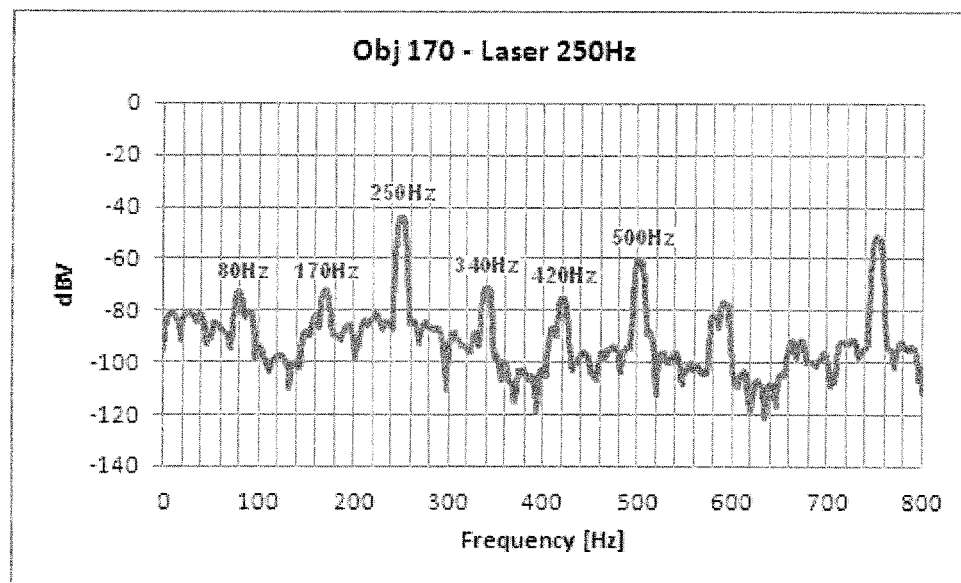
Figure 8G:
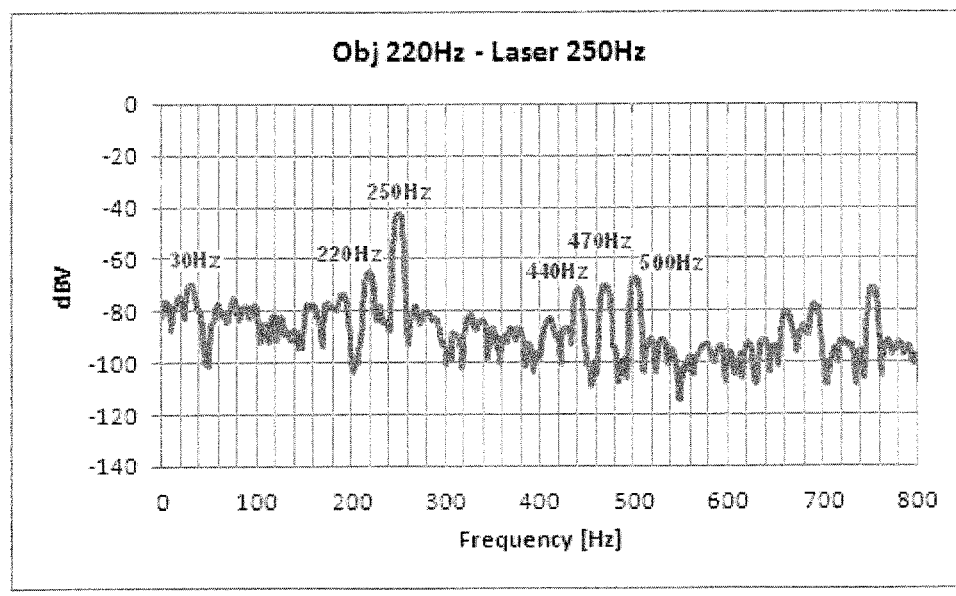

The laser modulation results are illustrated in FIGS. 8a-8g. In these experiments, the high frequency of the object is modulated by the laser frequency to low frequencies. In particular, FIG. 8a shows the laser frequency at 250 Hz and its harmonics; FIGS. 8b-8d show the object frequency, its harmonics and the 50 Hz line noise at 120 Hz, 170 Hz and 220 Hz respectively; FIGS. 8e-8g show the object frequencies with laser modulation at 250 Hz. In particular in FIG. 8e the object frequency is 120 Hz, in FIG. 8f the object frequency is 170 Hz and in FIG. 8g the object frequency is 220 Hz. The results show that the high frequency object signal is modulated to low frequencies within the detector frame rate window according to the frequencies difference but the frequencies had many harmonics frequencies due the convolution of the laser modulation.

The inventors of the present invention have made some experiment to test the mirror arrangement modulation using an open circuit without feedback. As described above, according to a broad aspect of the present invention, there is provided an imaging system for receiving an at least partially coherent light beam being indicative of at least one parameter of movement of a moving object, the system comprises an imaging unit comprising a detector; an interferometric module configured and operable to detect an interference pattern indicative of phase shifts of the object being indicative of temporal changes along a z-axis; the interferometric module comprises at least one beam splitter/combiner configured for receiving at least partially coherent light beam, splitting the beam into object and reference beams propagating along substantially identical optical paths; and at least one mirror arrangement located in the reference beam path and configured for reflecting the reference beam towards the detector through the beam splitter/combiner where it interferes with an object response to interaction with the object beam, wherein the at least one mirror arrangement is configured for displacement at a predetermined frequency to induce controllable temporal modulation of the interference pattern. The camera parameters were as follows: the exposure time was about 0.2 msec; the frame rate was about 100; the number of frames acquired was about 1000; the scan time was about 10 sec; the signal gain was about 0 dB and the gamma of the camera was about 2.2. The mirror arrangement parameters were as follows: the analogue amplifier output voltage was about 180 V; the modulation signal was a saw tooth signal; the frequency range was about 0-220 Hz; the voltage (Pk2Pk) was about 4.9 V and the offset was about 0 mV. The object parameters were as follows: the object signal was a sinusoidal signal, the frequency range was about 0-220 Hz; the voltage (Pk2Pk) was about 8 V and the offset was about 0 mV.

Figure 9A:
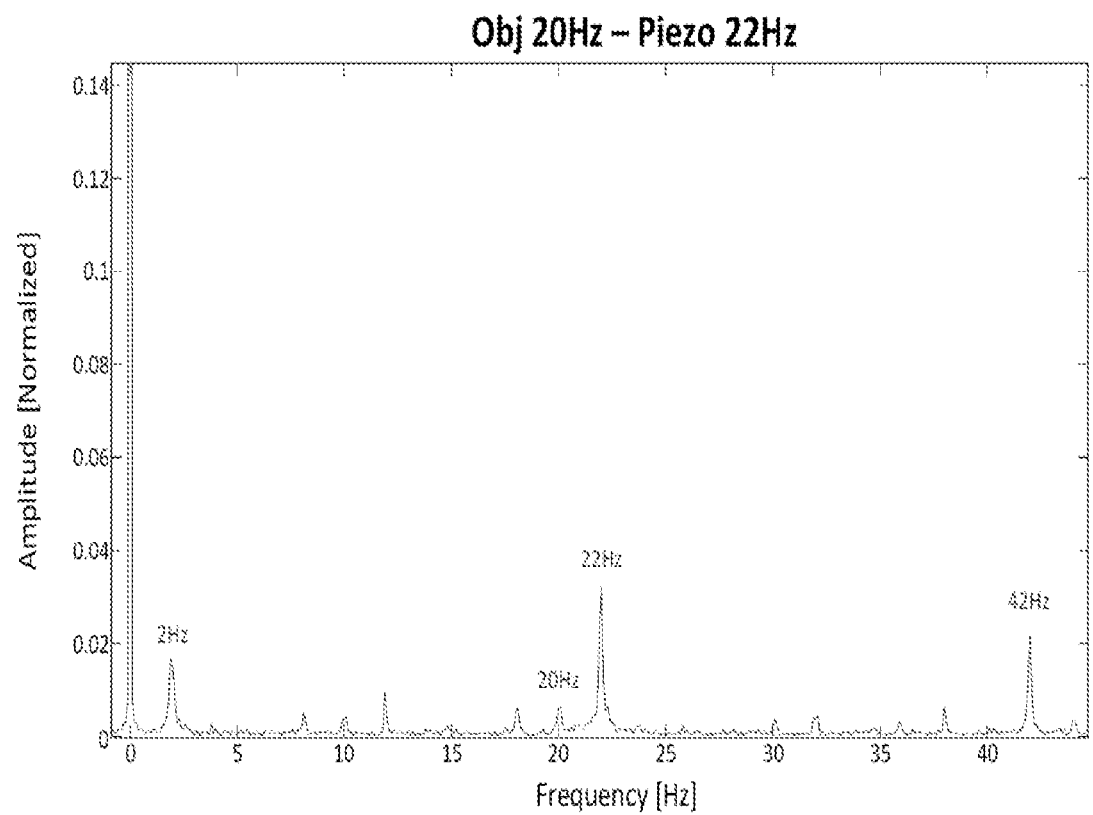
FIGS. 9a-9b show mirror modulation results.
Figure 9B:
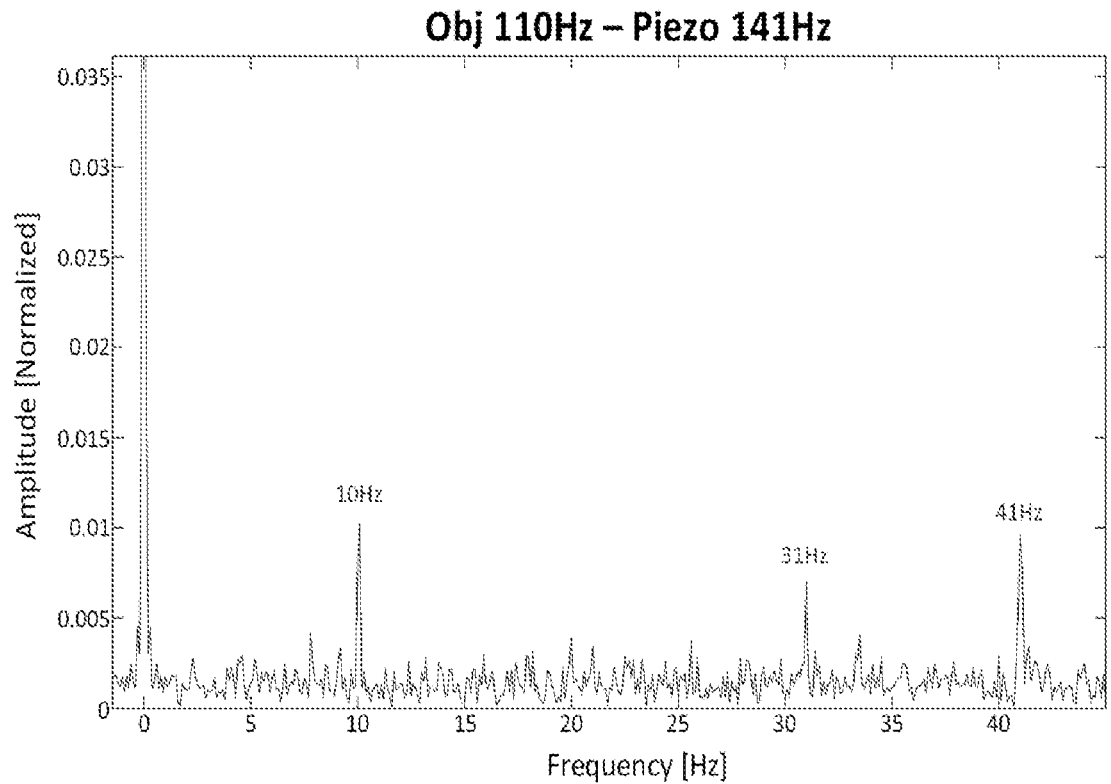

The mirror modulation results are illustrated in FIGS. 9a-9b. In these experiments, the high frequency of the object is modulated by a piezoelectric mirror frequency to low frequencies. In particular, FIG. 9a shows the object and modulation frequencies and their difference and addition frequencies when the object frequency is 20 Hz and the frequency of the piezoelectric mirror arrangement is 22 Hz; FIG. 9b shows the difference frequency and the cut frequencies (by 100 Hz of the detector) of the object and piezoelectric mirror object frequency when the object frequency is 110 Hz and the frequency of the piezoelectric mirror arrangement is 141 Hz. The results show that the high frequency object signal is modulated to low frequencies within the detector frame rate window according to the frequencies difference.

The inventors of the present invention have made some experiment to test the laser and the mirror arrangement modulations together using an open circuit without feedback. The laser parameters were as follows: the wavelength was about 532 nm, the power (on detector and camera) was in the range of about 5-13µ; the driver current was about 0.35 A; the modulation signal was about 25% on pulse; the frequency range was about 0-220 Hz; the voltage (Pk2Pk) was about 10 V and the offset was about 0 V. The detector parameters were as follows: the gain set was about 40 dB, the bandwidth was about 225 kHz; the FFT Offset was about −110 dBV. The camera parameters were as follows: the exposure time was about 0.2 msec; the frame rate was about 200; the number of frames acquired was about 1000; the scan time was about 5 sec; the signal gain was about 0 dB and the gamma of the camera was about 2.2. The mirror arrangement parameters were as follows: the analogue amplifier output voltage was about 180 V; the modulation signal was a saw tooth signal; the frequency range was about 0-220 Hz; the voltage (Pk2Pk) was about 4.9 V and the offset was about 0 mV. The object parameters were as follows: the object signal was a sinusoidal signal, the frequency range was about 0-220 Hz; the voltage (Pk2Pk) was about 10 V and the offset was about 0 V.

Figure 10:
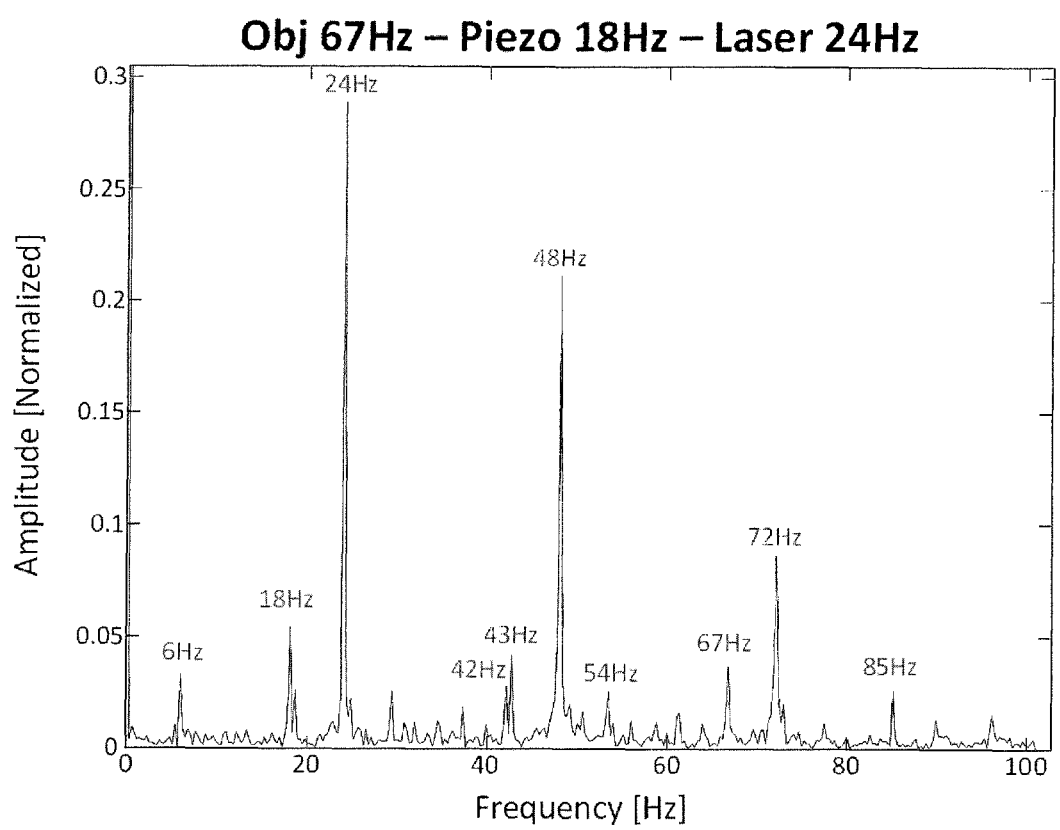
FIG. 10 shows laser and mirror arrangement modulation results.

The laser and mirror arrangement modulation results are illustrated in FIG. 10. The high frequency of the object is modulated by the laser and the piezoelectric mirror (noted herein below as piezo) frequencies to low frequencies. FIG. 10 shows the object and modulation frequencies and their difference and addition frequencies when the object frequency is 67 Hz, the frequency of the piezoelectric mirror arrangement is 18 Hz and the laser modulation frequency is 24 Hz. As illustrated in the figure, the difference and addition frequencies of the object and the modulation frequencies gave many combination frequencies such as: 6 Hz (laser-piezo), 42 Hz (laser+piezo), 43 Hz (object-laser), 48, 54, 72 Hz (harmonics of laser and piezo frequencies), 85 Hz (object+piezo) etc. The results show that the high frequency object signal is modulated to low frequencies within the detector frame rate window according to the frequencies difference.

The invention claimed is:

1. An imaging system for receiving an at least partially coherent light beam being indicative of at least one parameter of movement of a moving object, the system comprising:
    an imaging unit comprising a detector; wherein said imaging unit is configured and operable for imaging the moving object on an image plane and generating image data indicative of the moving object in an x-y plane; wherein said imaging unit comprises an optical transformer configured and operable for applying a spatial image space transformation of at least one parameter of movement in a three-dimensional space into geometric relation between the parameter of the movement and a spatial image space, by converting each of different components of six degrees of freedom of movement along three axial and tilt dimensions into a lateral translation; said imaging system generating motion data indicative of the six degrees of freedom of movement;
    an interferometric module configured and operable to detect an interference pattern indicative of phase shifts of the object being indicative of temporal changes along a z-axis; wherein said interferometric module comprises at least one beam splitter/combiner configured for receiving at least partially coherent light beam, splitting the beam into first object and reference beams; and at least one mirror arrangement located in the reference beam path and configured for reflecting the reference beam towards the detector through said beam splitter/combiner where the reference beam interferes with a second object beam being indicative of an object response to interaction with the first object beam, wherein said at least one mirror arrangement is configured for displacement at a predetermined frequency to induce controllable temporal modulation of the interference pattern;

said interferometric module being configured such that the object and reference beams propagate along optical paths having a substantially identical path length.

2. The system of claim 1, wherein said optical transformer applies at least one of Fourier transform, Mellin transform, coordinate transform including Cartesian coordinates transform into (log(r), θ) when r is a radial coordinate and θ is an angular coordinate or circular harmonic transform.

3. The system of claim 1, further comprising a pinhole for collecting a portion of the secondary speckle patterns.

4. The system of claim 1, wherein said imaging unit is selectively operable to provide an unfocused image of the object in the object plane, collect a sequence of secondary speckle patterns and determine at least one shift between regions of the object which appear in the sequence of secondary speckle patterns, to thereby provide motion data indicative of motion of the object along a tilt dimension and image data in an x-y plane.

5. The system of claim 4, comprising a source of at least partially coherent light.

6. The system of claim 5, wherein said source generates pulsed light having a modulation frequency selected to enable correlation between illumination and detection sessions.

7. The system of claim 4, further comprising a filter placed in the reference beam path and configured for equalizing intensities of light propagating along the reference and object paths.

8. The system of claim 4, further comprising a feedback circuit placed between the detector downstream of the reference beam path, said feedback circuit being configured for correcting frequency multiplication.

9. The system of claim 4, wherein said imaging unit comprises said interferometric module configured and operable to collect the interference pattern.

10. The system of claim 4, comprising a support surface for supporting the object and applying a periodic stimulation to the object.

11. The system of claim 4, wherein said imaging unit is selectively operable to provide at least one of unfocused image and focused image of the object in the object plane, wherein the focused image of the object is indicative of at least one of movement in the x-y plane and z-axis movement and the unfocused image of the object is indicative of angular tilting dimension.

12. A method for monitoring at least one parameter of movement of a moving object, the method comprising:

splitting at least one partially coherent light beam into a first object and reference beams along two similar paths;

receiving a second object beam being reflected from the moving object;

imaging the moving object on an image plane;

detecting an interference pattern indicative of phase shifts of the object caused by a change in length of one of the paths; the interference pattern being indicative of temporal changes along a z-axis;

inducing controllable temporal modulation of the interference pattern;

applying an optical spatial image space transformation to at least one parameter of a movement in a three-dimensional space to provide geometric relation between the parameter of the movement and a spatial image space, said spatial image space transformation being configured for converting each of different components of six degrees of freedom of movement along three axial and tilt dimensions into a lateral translation; and generating motion data being indicative of six degrees of freedom of movement.

13. The method of claim 12, wherein said optical transformation comprises at least one of Fourier transform, circular harmonic transform, Mellin transform, coordinate transform including Cartesian (x,y) coordinates into (log(r), θ) when r is a radial coordinate and θ an angular coordinate.

14. The method of claim 12, comprising separating an at least partially coherent light beam in a first and second beams propagating along first and second optical paths; positioning an imaging unit in the first optical path and collecting at the imaging unit a sequence of secondary speckle patterns; wherein said sequence of secondary speckle patterns is focused on a plane displaced from the moving object and determining at least one shift between regions of the object appearing in the sequence of secondary speckle patterns.

15. The method of claim 12, comprising illuminating the moving object with at least partially coherent light beam.

16. The method of claim 15, comprising selecting a coherence length for the coherent beam to provide a desired ratio between a size of an illumination spot and size of the speckles in a captured set of patterns.

17. The method of claim 12, comprising applying a stimulation field of a periodically changing stimulation frequency to an object.

18. The method of claim 12, comprising concurrently imaging the interference pattern onto the imaging plane.

19. The method of claim 18, comprising separating between the interference pattern and the motion data being concurrently imaged onto the imaging plane by providing a temporal modulation to the interference pattern.

20. The method of claim 12, comprising measuring at least one of velocity and frequency of the moving object along the z-axis.

21. The method of claim 15, comprising separating between the moving object and a reflecting surface at least partially surrounding the object by selecting the coherence length of said at least partially coherent light beam to be shorter than a typical distance between the object and the reflected surface.

* * * * *